United States Patent
O'Mahony et al.

(10) Patent No.: US 6,522,186 B2
(45) Date of Patent: Feb. 18, 2003

(54) HIERARCHICAL CLOCK GRID FOR ON-DIE SALPHASIC CLOCKING

(75) Inventors: Frank O'Mahony, San Carlos, CA (US); Mark A. Anders, Hillsboro, OR (US); Krishnamurthy Soumyanath, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/893,067

(22) Filed: Jun. 27, 2001

(65) Prior Publication Data

US 2003/0001652 A1 Jan. 2, 2003

(51) Int. Cl.⁷ .................................................. G06F 1/04
(52) U.S. Cl. ........................ 327/295; 327/293; 327/297
(58) Field of Search ................................. 327/295, 291, 327/292, 293, 296, 297, 415, 564, 565; 326/101, 93

(56) References Cited

U.S. PATENT DOCUMENTS

| | | | | |
|---|---|---|---|---|
| 5,387,885 A | * | 2/1995 | Chi | 333/100 |
| 5,410,491 A | * | 4/1995 | Minami | 364/491 |
| 5,497,109 A | * | 3/1996 | Honda et al. | 326/93 |
| 5,519,351 A | * | 5/1996 | Matsumoto | 327/295 |
| 5,521,541 A | * | 5/1996 | Okamura | 327/297 |
| 5,570,045 A | * | 10/1996 | Erdal et al. | 326/93 |
| 5,668,484 A | * | 9/1997 | Nomura | 326/93 |
| 5,691,662 A | * | 11/1997 | Soboleski et al. | 327/292 |
| 5,717,229 A | * | 2/1998 | Zhu | 257/208 |
| 6,043,704 A | * | 3/2000 | Yoshitake | 327/565 |
| 6,150,865 A | * | 11/2000 | Fluxman et al. | 327/292 |
| 6,157,688 A | * | 12/2000 | Tamura et al. | 375/348 |
| 6,211,714 B1 | * | 4/2001 | Jeong | 327/293 |
| 6,255,884 B1 | * | 7/2001 | Lewyn | 327/295 |
| 6,311,313 B1 | * | 10/2001 | Camporese et al. | 716/6 |
| 6,323,714 B1 | * | 11/2001 | Naffziger et al. | 327/295 |
| 6,429,714 B1 | * | 8/2002 | Schultz | 327/291 |

* cited by examiner

Primary Examiner—Timothy P. Callahan
Assistant Examiner—Hai L. Nguyen
(74) Attorney, Agent, or Firm—Schwegman, Lundberg, Woessner & Kluth, P.A.

(57) ABSTRACT

A hierarchical clock distribution system includes a global clock grid that distributes a clock signal to a plurality of regional clock grids. Each of the regional clock grids then distributes the signal to a plurality of corresponding loads. The regional clock grids utilize salphasic clocking techniques to distribute the clock signal to the corresponding loads. The global grid achieves low skew based on the periodicity of the clock signal, rather than the dominance of a standing wave. The electrical distance to termination within the regional clock grids is preferably kept low to avoid the occurrence of phase change regions on the regional grids. In one approach, the regional grids are each driven at multiple points in a symmetrical fashion to reduce the electrical distance to termination.

27 Claims, 4 Drawing Sheets

HIERARCHICAL CLOCK GRID FOR ON-DIE SALPHASIC CLOCKING

FIELD OF THE INVENTION

The invention relates generally to microelectronic circuits and, more particularly, to clock distribution structures for use therein.

BACKGROUND OF THE INVENTION

Clock distribution has become a major on-chip performance bottleneck within microprocessors and other integrated circuits (ICs). As clock frequencies increase, proportionately lower clock skews are required. At the same time, clock interconnects begin to behave more like transmission lines than simple resistance-capacitance (RC) networks. For conventional clock grids and trees, which seek to remain in the RC domain, two options for supporting increased clock speeds include: (a) increasing the resistance and capacitance of the clock lines relative to inductance of the lines, and (b) reducing the interconnect length between buffers within the clock network. Neither of these approaches, however, can provide the performance increases that will be required by integrated circuits of the future. For example, an increase in line capacitance will typically require an increase in power. As ICs become smaller, however, on-die heat dissipation becomes a bigger problem and lower power circuit techniques are desired. Also, an increase in either resistance or capacitance will increase the time constant of the circuit, which increases skew. Similarly, a reduction in interconnect length between buffers will require the insertion of additional buffers into the clock network, which will increase power consumption and typically result in additional clock jitter and skew.

Salphasic clocking is a technique that makes use of standing waves to achieve low clock skew within a system. Salphasic clocking techniques also typically consume substantially less power than other known clocking strategies. In the past, it has been difficult to implement salphasic clocking on-die within an IC. One reason for this difficulty is that salphasic clocking generally requires a low loss transmission medium to maintain a dominant standing wave. On-die interconnects, however, have traditionally been relatively lossy structures. In an ideal lossless system, standing waves include abrupt 180 degree phase changes at specific locations on the corresponding transmission medium. When loss is introduced, however, the abruptness of the phase changes are reduced, creating regions of unacceptable phase differences on the medium. These phase differences can introduce a significant amount of clock skew to the system. In addition, the inherent position dependent amplitudes associated with salphasic clocking techniques can also introduce skew, even in a relatively lossless system.

DETAILED DESCRIPTION

Figure 1:
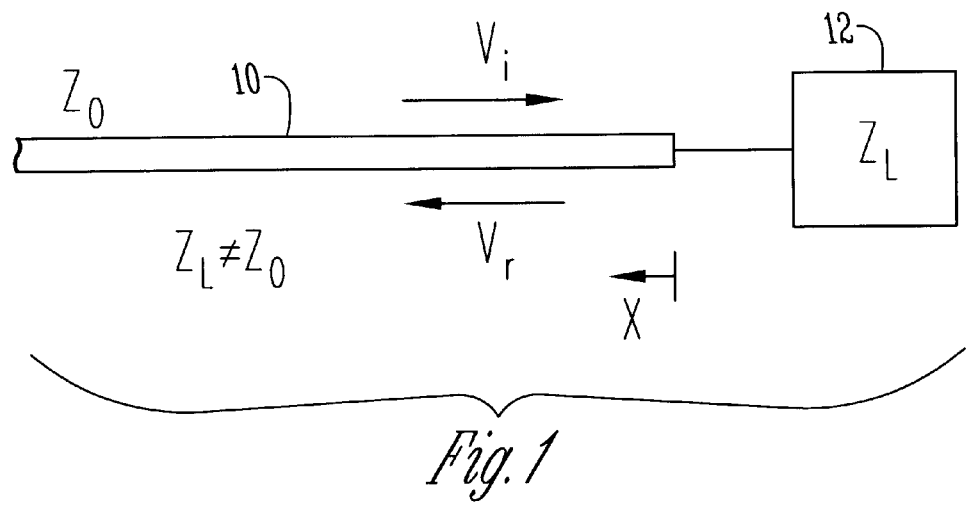
FIG. 1 is a diagram illustrating the reflection of a traveling wave from an unmatched termination on a transmission medium.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Salphasic clocking systems take advantage of the unique characteristics of standing waves to effect low skew clock distribution. A standing wave is created whenever a wave traveling on a transmission medium encounters an unmatched condition (e.g., an unmatched termination or other impedance discontinuity). When the wave encounters the unmatched condition, some or all of the incident energy of the wave is reflected back into the transmission medium as a reflected wave. For example, as illustrated in FIG. 1, a traveling wave $V_i$ propagating on a transmission medium 10 (having a characteristic impedance $Z_O$) is incident upon a load impedance $Z_L$ 12 terminating the line. Because $Z_L$ is not equal to $Z_O$, a wave $V_r$ is reflected back onto the transmission medium 10 by the load impedance. The frequency of the reflected wave $V_r$ is the same as the frequency of the incident wave $V_i$. The magnitude and phase of the reflected wave $V_r$ will depend upon, among other things, the relationship between $Z_L$ and $Z_O$. The incident wave $V_i$ and the reflected wave $V_r$ combine on the transmission medium 10 to form a standing wave on the medium 10.

Figure 2:
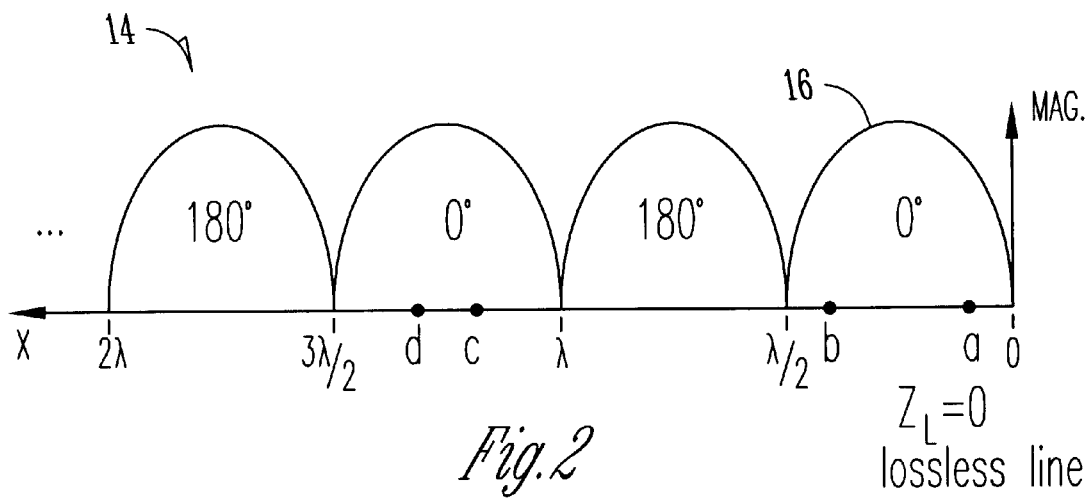
FIG. 2 is a diagram illustrating a standing wave pattern that results when a lossless transmission line is terminated in a short circuit.

A standing wave is typically represented as an envelope showing the maximum signal amplitude that will occur at points along a transmission medium. FIG. 2 is a diagram illustrating a standing wave pattern 14 that develops on a lossless transmission medium that is terminated in a short circuit (i.e., $Z_L=0$). Because of the short circuit, the standing wave pattern 14 has a magnitude of zero at the location of the termination (i.e., at x=0). The standing wave pattern 14 also has a number of zero magnitude minima at half wavelength intervals along the medium 10 from the termination point (i.e., at x=$\lambda/2$, $\lambda$, $3\lambda/2$, etc.). At these points, the incident wave and the reflected wave each have the same amplitude and opposite polarity (for all time t) and thus cancel one another. Standing wave maxima 16 occur at points between the minima (e.g., at $x=\lambda/4, 3\lambda/4, 5\lambda/4$, etc) where the incident and reflected waves combine in-phase. When a standing wave exists on a medium, the signal at any particular point x along the medium will oscillate between a positive and negative maximum value. This maximum value is indicated by the magnitude of the standing wave envelope at that particular location x. Standing wave patterns having zero magnitude minima will result whenever a lossless transmission line is terminated in a lossless load impedance (e.g. an open circuit, a short circuit, a pure reactance). Such standing waves will be referred to herein as "pure standing waves." The location of the minima and maxima in a pure standing wave will depend upon the type of lossless load impedance that is being used (e.g., an open circuit will generate maxima x=0 and at intervals of $\lambda/2$ therefrom, etc.).

A significant feature of standing waves is that they have a phase that, to a large extent, is position independent. With reference to FIG. 2, for example, all points on the medium between x=0 and $x=\lambda/2$ will have the same signal phase (say, e.g., zero degrees) regardless of position. Similarly, all points on the medium between $x=\lambda/2$ and $x=\lambda$ will have the same phase, but will be 180 degrees out of phase with the points between x=0 and $x=\lambda/2$. Between $x=\lambda$ and $x=3\lambda/2$ the phase is the same as the phase between x=0 and $x=\lambda/2$, and so on. Thus, the signal phase changes abruptly by 180 degrees at half wavelength intervals along the medium, but within each region the signal phase is substantially constant (i.e., position independent). Salphasic clocking seeks to take advantage of these phase attributes to provide low skew clock distribution within a system.

Figure 3:
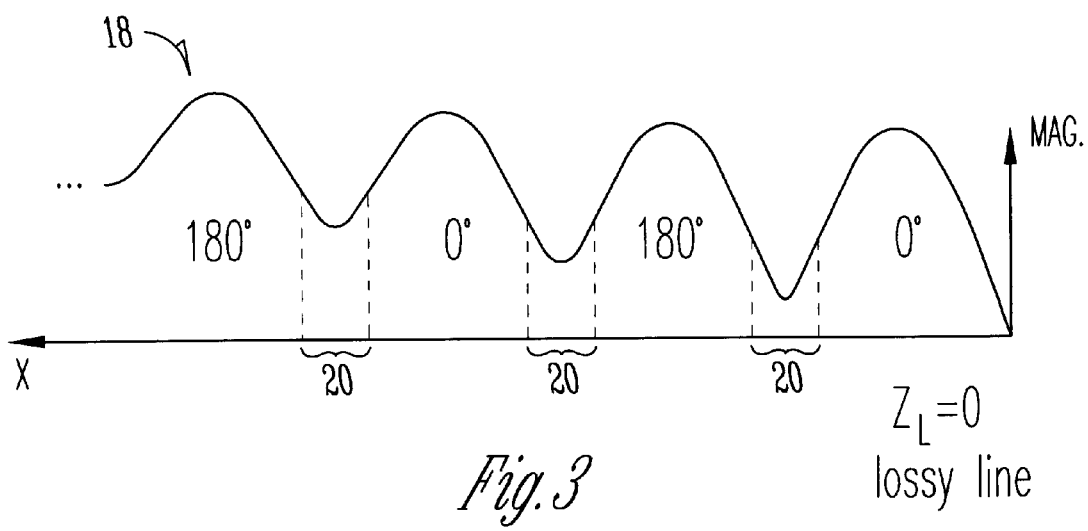
FIG. 3 is a diagram illustrating a standing wave pattern that results when a lossy transmission line is terminated in a short circuit.

When either the load impedance 12 or the transmission medium 10 has loss, a pure standing wave will not be achieved. This is because the incident wave and the reflected wave will not have the same amplitude at the stationary minima points and, therefore, will not cancel. The combined signal on the transmission medium 10 will thus be part standing wave and part traveling wave. FIG. 3 illustrates a standing wave pattern 18 that results when a lossy transmission medium is terminated in a short circuit. As shown, the minima of the standing wave pattern 18 do not extend to zero as in the case of the pure standing wave. Also, the minima are rounded instead of being sharp. Thus, there are no abrupt 180 phase changes as in the pure standing wave. Instead, there are regions 20 where the phase slowly transitions between zero degrees and 180 degrees. These regions of transitioning phase can significantly impact the ability to provide low skew clocking in a salphasic system.

The present invention relates to a hierarchical clock distribution system for use in distributing a clock signal to multiple clocked elements in a relatively low skew manner using salphasic clocking techniques. The hierarchical clock distribution system is capable of low skew clock distribution even when relatively lossy transmission structures are being used. Thus, the clock distribution system can be used to provide on-die salphasic clocking within a microelectronic device (e.g., a microprocessor or other digital processing device). In one embodiment, the hierarchical system uses a global grid structure to distribute a clock signal to a plurality of regional grids. Each of the regional grids then distributes the clock signal to a plurality of corresponding loads (i.e., elements being clocked). The global grid achieves low skew based on the periodicity of the clock signal, rather than the dominance of a standing wave. For this reason, many of the inherent problems associated with salphasic clocking on lossy lines are avoided on the global grid. The regional grids, on the other hand, utilize salphasic clocking techniques to distribute the clock signal to the corresponding loads.

Preferably, the regional grids are designed to avoid standing wave phase change regions that can introduce skew into the system. In one approach, this is accomplished by maintaining the electrical distance to termination on the regional grids below a predetermined value (e.g., one-half wavelength). The inventive principles can be used to distribute a clock signal in any of a wide range of different systems requiring low skew clocking. As described above, the inventive principles are particularly beneficial for use in on-die salphasic clock distribution.

Figure 4:
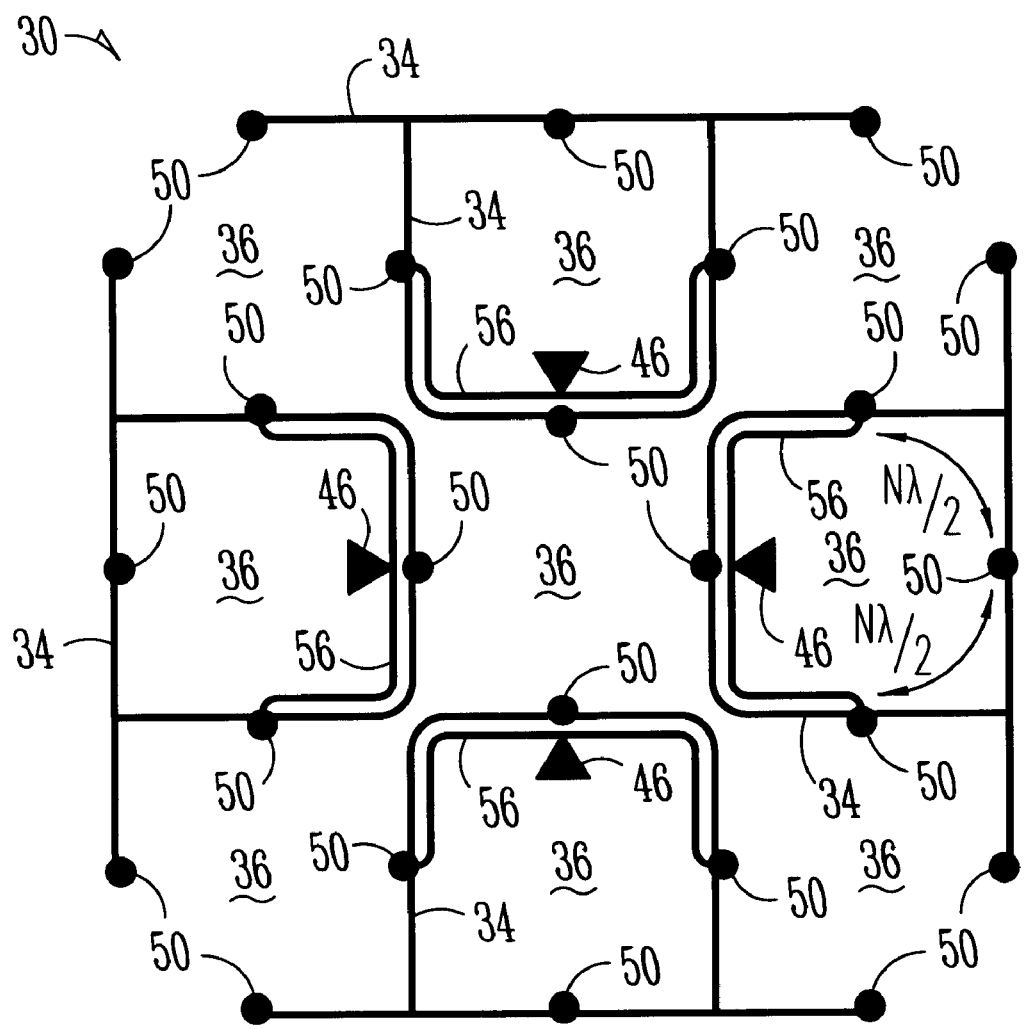
FIG. 4 is a top view illustrating a global clock grid in accordance with one embodiment of the present invention.
Figure 5:
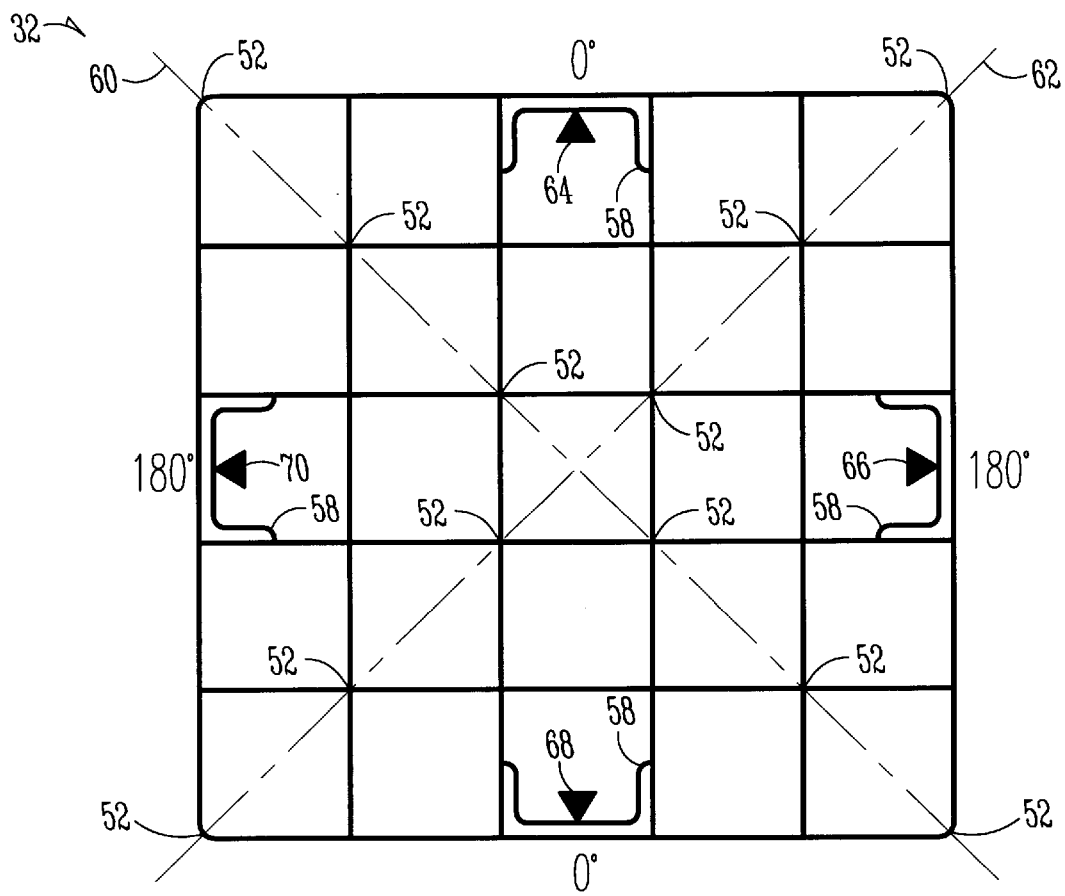
FIG. 5 is a top view illustrating a regional clock grid in accordance with one embodiment of the present invention.

FIGS. 4 and 5 are top views illustrating a global clock grid 30 and a regional clock grid 32, respectively, in accordance with one embodiment of the invention. The global clock grid 30 is operative for distributing an input clock signal to a plurality of the regional grids 32 within the same clock distribution system. The regional clock grids 32 then distribute the clock signal to a plurality of loads (not shown in FIG. 5) coupled to each regional grid 32. As shown in FIG. 4, the global grid 30 includes a plurality of transmission line segments 34 that are arranged in a grid pattern. The transmission line segments 34 of the global grid 30 define a number of substantially square regions 36. The regional grids 32 can be implemented within the square regions 36 of the global grid 30 on a common metal layer as the global grid 30 or in alignment with the square regions 36 on a different metal layer.

Figure 6:
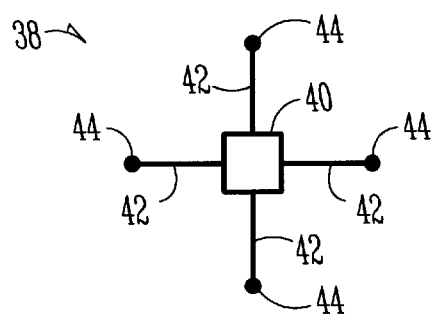
FIG. 6 is a top view illustrating a feed structure that is used to feed the global grid of FIG. 4 in accordance with one embodiment of the present invention.

FIG. 6 illustrates a feed structure 38 that is used to feed the global grid 30 in accordance with one embodiment of the present invention. The feed structure 38 will be centrally located with respect to the global grid 30 and can be on the same metal layer as the global grid 30 or on a different layer. As shown, the feed structure 38 includes a clock signal source 40 (e.g., an oscillator and phase locked loop) with four equal length transmission line segments 42 extending therefrom. Each of the transmission line segments 42 emanating from the clock source 40 is terminated at a receiver point 44. Each receiver point 44 will typically have a receiver associated with it for sensing the clock signal at that point. The signals at the receiver points 44 are each coupled to the input of a corresponding buffer 46 on the global grid 30 through, for example, a via connection. Because the transmission line segments 42 are each the same length, the buffers 46 on the global grid 30 are each driven at substantially the same phase. As will be appreciated, other techniques for providing multiple equal phase input clock signal components also exist. In a preferred approach, a sinusoidal clock signal is used within the clock distribution system to facilitate phase detection at the load locations. Also, small signal, differential signaling is preferred to provide low power, highly robust operation. It should be appreciated, however, that many alternative clock signal schemes can be used in accordance with the present invention.

Referring back to FIG. 4, the buffers 46 each drive a separate portion of the global grid 30 in the illustrated embodiment. Each of these grid portions has a number of receiver points 50 distributed thereon at predetermined locations. As before, each receiver point 50 can include a receiver unit to sense the signal at that point. The signals from the receiver points 50 are each coupled to the inputs of corresponding buffers 64, 66, 68, 70 within an associated regional grid 32. If the regional grids 32 are on a different layer than the global grid 30, via connections will be used to couple the signals receiver points 50 to the buffer inputs on the regional grids 32. If the regional grids 32 are on the same layer as the global grid 30, the coupling can be made with a trace on the same or a different layer.

Significantly, the receiver points 50 on the global grid 30 are located at positions on the grid 30 that are a multiple of one-half wavelength (i.e., Nλ/2, where N is a positive integer) from one another at the nominal clock frequency of the system. Therefore, the signal phases at the receiver points 50 on the global grid 30 are established based upon the periodicity of the traveling waves thereon, and not by the dominance of standing waves on the global grid 30. In one embodiment, the receiver points 50 are each located λ/2 from one another on the global grid 30. Thus, each receiver point 50 receives a clock signal component that is 180 degrees out of phase with signal components received at each adjacent receiver point 50. As will be described in greater detail, in one embodiment of the present invention, this 180 degree phase difference is used within the regional grids 32 to reduce the electrical distance to termination therein.

In a clock distribution network, skew is typically greatest in the vicinity of the buffers that are driving the network. Thus, in one aspect of the present invention, separate transmission line sections 56 are provided within the global grid 30 to receive the drive signal from each buffer 46. As illustrated in FIG. 4, each buffer 46 is coupled to a center drive point on a corresponding transmission line section 56. The ends of the transmission line sections 56 are each connected to one of the receiver points 50 of the global grid 30. Because the buffer 46 is centered, the phase of the clock signal components at the ends of the transmission line sections 56 are equal. The signals from the transmission line sections 56 propagate out onto the transmission line segments 34 of the global grid 30 as traveling waves where they are sensed at the corresponding receiver points 50. There will also be a standing wave component on the transmission line segments 34 of the global grid 30. In one embodiment, the transmission line sections 56 are each one wavelength long at a nominal clock frequency of the system.

As illustrated in FIG. 4, various symmetry points exist within the global grid 30 that allow the grid to be separated into multiple portions. These symmetry points are located along lines that are equidistant from the global grid buffers 46 where amplitude components from the buffers are each ideally equal. By separating portions of the grid at these points, amplitude variation can be decreased within the clock distribution system. It should be appreciated that the particular shape, size, and arrangement of the global grid 30 of FIG. 4 are not meant to be limiting. That is, a wide variety of shapes, sizes, and configurations are possible in accordance with the present invention.

The regional grids 32 of the clock distribution system utilize salphasic techniques to maintain low skew. In one aspect of the present invention, each regional grid 32 is driven at multiple drive points to reduce the effective distance to termination within the grid 32. By reducing the effective distance to termination, the number of phase change nodes within the regional grid 32 can be reduced (or such nodes can be eliminated entirely). For example, the regional grid 32 of FIG. 5 is driven at four points by four different buffers 64, 66, 68, 70. The buffers 64, 66, 68, 70 are each substantially centered with respect to one of the sides of the regional grid 32 (which is square in shape). As with the global grid 30, the regional grid 32 can include separate transmission structures 58 to receive the drive signals from the buffers 64, 66, 68, 70 to shield the grid 32 from the skew associated with the buffers. As illustrated, the regional grid 32 includes multiple lines of symmetry 60, 62 that represent points that are equidistant from the buffers 64, 66, 68, 70. Therefore, the points 52 on the grid 32 that are intersected by the lines of symmetry 60, 62 are each equidistant (i.e., electrically as well as physically) from the two closest buffers.

As described previously, in one embodiment of the invention, the receiver points 50 on the global grid 30 are separated from one another by one half wavelength along the corresponding transmission line segments. Thus, the clock signal components output by adjacent buffers within the regional grid 32 will be 180 degrees out of phase from one another. For example, the clock signal component at buffer 64 of the regional grid 32 will be 180 degrees out of phase with the clock signal component at buffer 66 of the regional grid 32. Similarly, the clock signal component at buffer 68 of the regional grid 32 will be 180 degrees out of phase with the clock signal component at buffer 70 of the regional grid 32. Buffers on opposing sides of the regional grid 32 (i.e., buffers 64 and 68 or buffers 66 and 70) will output signal components that are in phase. When the system is operative, zero voltage nodes will be created at each of the symmetry points 52 on the regional grid 32 as the signal components from the buffers will have the same amplitude and a 180 degree phase difference at each of the symmetry points 52. These nodes, therefore, will appear as short circuit nodes within the regional grid 32. The distance to termination (i.e., to the short circuit nodes) is therefore reduced within the regional grid 32. In one approach, the maximum electrical distance between the buffers 64, 66, 68, 70 and the symmetry points 52 (i.e., the distance to termination) is kept below λ/2 to prevent the occurrence of phase change regions on the regional grid 32.

When a square-shaped regional grid is used, a minimal distance to termination is achieved by driving the grid at the mid-points of each side of the grid, as described above. It should be appreciated, however, that other techniques for driving the regional grids 32 are also possible, such as driving the grids at each of the four corners or at more or less than four locations. It should also be appreciated that the particular shape, size, and arrangement of the regional grid 32 of FIG. 5 are not meant to be limiting. That is, a wide variety of shapes, sizes, and configurations are possible in accordance with the present invention.

In another embodiment of the invention, the clock signal components output by each of the four buffers 64, 66, 68, 70 on the regional grid 32 are all in phase. This can be accomplished by, for example, making the receiver points 50 within the global grid 30 one wavelength apart (or an integer multiple thereof). Alternatively, in a system that uses differential lines, the differential inputs of two of the buffers on the regional grid 32 can be switched (e.g., buffer 66 and buffer 70) to achieve four in-phase drive signals on the regional grid 32. When the regional grid drive signals are in-phase, the signal components at each symmetry point 52 on the regional grid 32 from each corresponding buffer are in phase and thus combine to form a magnitude maximum on the grid 32. The symmetry points 52 will thus appear as open circuit nodes. As before, the effective distance to termination is reduced. Significantly, if the maximum electrical distance between each symmetry point 52 and its corresponding buffers is kept below λ/4 (where λ is the wavelength of the standing wave), then phase change regions (e.g., region 20 in FIG. 3) can be avoided on the regional grids. In one approach, the propagation constant p of the regional grid lines is made low to increase the standing wave wavelength and thus ensure the absence of phase change nodes on the regional grid.

As described above, a plurality of unbalanced loads will be connected to each of the regional grids 32. These loads are the actual circuits that are to be clocked by the clock distribution system. The load device receivers can be coupled anywhere on the corresponding regional grid 32.

That is, they are not limited to predetermined locations like the receiver points 50 of the global grid 30. As in any standing wave pattern, there will be amplitude variation with position on the lines of the regional grid 32. This position dependent amplitude variation can result in skew in a salphasic system, even when near lossless conditions are maintained. In one embodiment of the present invention, therefore, receivers are used for the load devices that have an opposite magnitude dependence so that the skew is cancelled within the receiver.

As described above, the receiver points 50 on the global grid 30 are spaced $N\lambda/2$ from one another at a nominal clock frequency of the clock distribution system. When the clock frequency of the system is varied, however, the receiver points 50 will not be properly positioned within the global grid 30 to achieve low skew. That is, acceptable skews will only be possible within a relatively narrow band of frequencies about the nominal frequency. In one aspect of the present invention, tuning capability is added to the global grid 30 to allow a greater range of clock frequencies to be used. In one approach, for example, the global grid 30 is designed to support a maximum desired clock frequency. Switchable load capacitances are then provided that allow the global grid 30 to be tuned in the field to operate at slower than maximum frequencies. In one approach, for example, the gate capacitance of one or more N-type metal oxide semiconductor (NMOS) transistors is used to provide a load capacitance for the global grid. The gate terminal of each NMOS transistor is coupled to the global grid 30 through a transmission gate. The source, drain, and body of each NMOS transistor is preferably tied to ground. To tune the global grid 30 to another frequency, the transmission gates are turned on, thus coupling the gate capacitances of the NMOS devices between the global grid 30 and ground. Many other global grid tuning strategies are also possible.

During operation of the clock distribution system, the global grid 30 will carry both standing waves and traveling waves. Because of the loss on the lines of the global grid, the traveling waves will typically be dominant. As described above, because of the way the receiver points 50 are spaced, low skew can be achieved on the global grid 30 at least within a small range of clock frequencies. The standing waves that are present on the global grid 30 will tend to increase the range of frequencies for which acceptable skew values can be achieved. This is because the standing waves will tend to make the phase of the signals at the receiver points 50 less position sensitive. As transmission line loss is reduced, the standing wave amplitudes on the global grid 30 will become greater (i.e., the global grid will become more salphasic). Therefore, in one approach, an expanded operational frequency range is achieved by using less lossy transmission line structures within the global grid 30.

Figure 7:
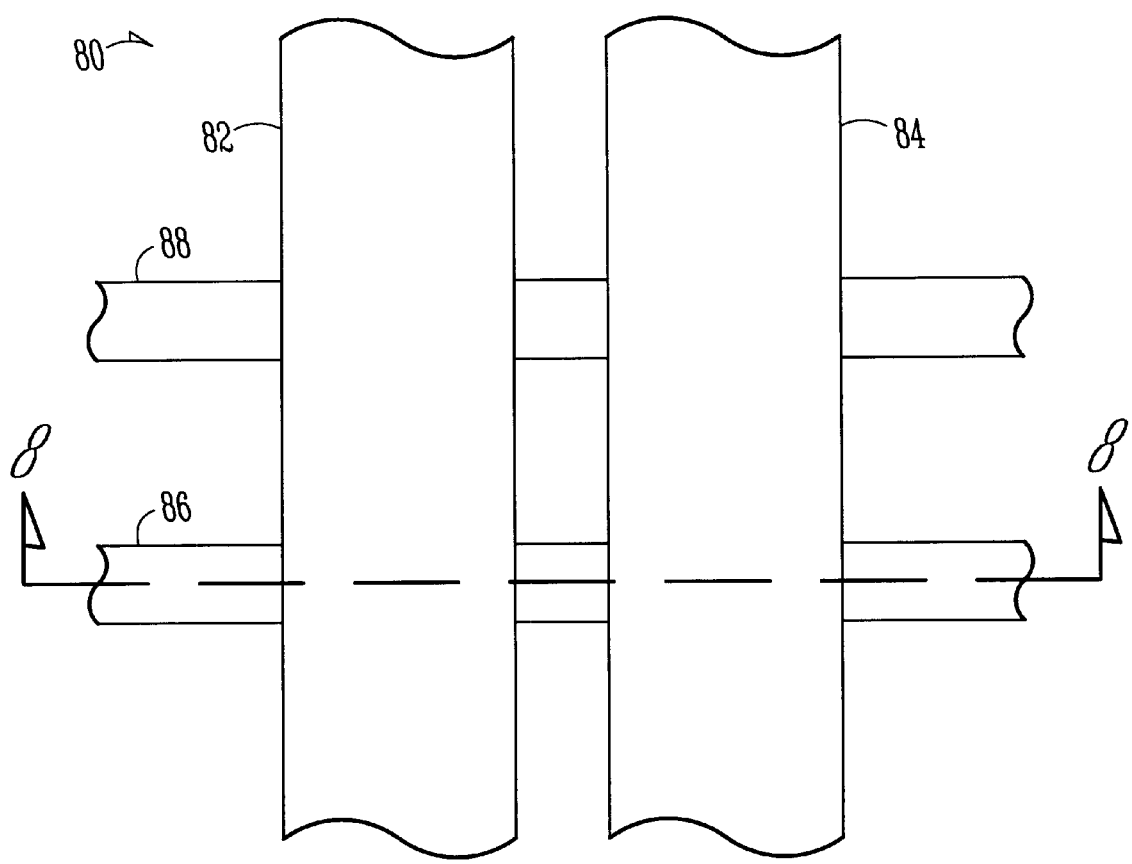
FIGS. 7 and 8 are a top view and a sectional side view, respectively, of a low loss interconnect structure that is used within a clock distribution system in accordance with one embodiment of the present invention.
Figure 8:
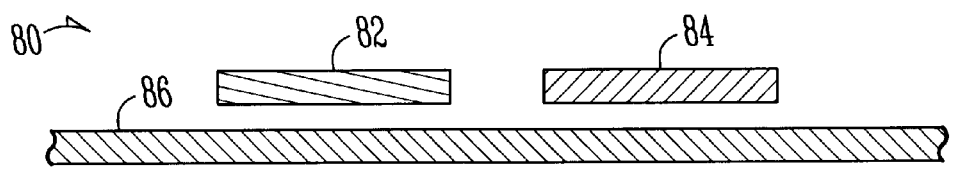

As described previously, the salphasic nature of a transmission structure will increase as the signal loss of the structure is reduced. FIGS. 7 and 8 are a top view and a sectional side view, respectively, of a low loss interconnect structure 80 that is used in at least one embodiment of the present invention to form some or all of the transmission lines within the regional grids 32 of the clock distribution system. The interconnect structure 80 can also be used to form the transmission lines of the global grid 30 of the system. The interconnect structure 80 includes first and second differential signal lines 82, 84 on a first metal layer of a die to carry a differential clock signal. One or more orthogonal traces 86, 88 may also exist on an adjacent metal layer of the die in proximity to the first and second differential signal lines 82, 84 for use as, for example, signal or power lines.

The attenuation coefficient ($\alpha$) of a transmission line can be represented by the following equation:

$$\alpha = Re\sqrt{((R+j\omega L)(G+j\omega C))}$$

where R is the series resistance per unit length, L is the series inductance per unit length, G is the shunt conductance per unit length, and C is the shunt capacitance per unit length. Thus, the loss of a transmission line can be reduced significantly by decreasing R/L without significantly increasing C. In the interconnect structure 80 of FIGS. 7 and 8, the orthogonal traces 86, 88 on the lower metal layer are capacitively coupled to the differential signal traces 82, 84. However, because they are orthogonal to the signal traces 82, 84, the orthogonal traces 86, 88 provide a high impedance return path to signal components propagating on the differential signal traces 82, 84. For this reason, the best return path for signal components on each differential signal line 82, 84 is through the other differential signal line 84, 82. The differential signal lines 82, 84 are made relatively wide to reduce R within the interconnect 80 (which further reduces R/L). In one design approach, the widths of the two differential signal lines 82, 84 are increased until the corresponding increase in capacitance begins to increase the loss of the interconnect 80. The spacing between the differential signal lines 82, 84 is then increased until the additional decrease in loss due to the increase in inductance no longer justifies the increased area consumed by the interconnect 80.

Because the interconnect 80 of FIGS. 7 and 8 is a differential structure, it is capable of rejecting common mode noise within the microelectronic device. To support differential operation, the buffers, receivers, and repeaters (if any) used in connection with the interconnect 80 should be differential structures. In one implementation, an interconnect using the inventive principles achieved a loss of 0.790 decibels per millimeter (dB/mm) and a phase constant of 0.885 radians/mm at an operational frequency of 10 gigahertz (gHz). In contrast, a conventional interconnect (e.g., interconnect 10 of FIG. 1) having similar dimensions and materials produces a loss of 1.867 dB/mm and a phase constant of 0.610 radians/mm at 10 gHz. It should be appreciated that a wide variety of alternative transmission structures (e.g., microstrip, stripline, coplanar waveguide, interleaved interconnects, etc.) can also be used within the global and regional grids 30, 32 of the present invention.

Although the present invention has been described in conjunction with certain embodiments, it is to be understood that modifications and variations may be resorted to without departing from the spirit and scope of the invention as those skilled in the art readily understand. For example, the hierarchical clock distribution system of the present invention is not limited to two grid levels (i.e., global and regional grids). That is, additional grid levels can also be implemented as part of the low skew clock distribution system. Such modifications and variations are considered to be within the purview and scope of the invention and the appended claims.

What is claimed is:

1. A clock distribution system comprising:
   a global grid having a plurality of transmission line segments to distribute an input clock signal to a plurality of receiver points on said global grid, said plurality of receiver points being spaced $N\lambda/2$ from one another on said global grid, where N is a positive integer and $\lambda$ is the wavelength of a signal on said global grid having a nominal clock frequency; and
   a regional grid that is coupled to multiple receiver points on said global grid to receive clock signal components from said global grid to drive said regional grid, said regional grid to generate standing waves using said clock signal components received from said global grid, said standing waves to distribute said clock signal throughout said regional grid in a relatively low skew manner.

2. The clock distribution system of claim 1, wherein:
each of said plurality of receiver points on said global grid is located $\lambda/2$ from each adjacent receiver point on said global grid.

3. The clock distribution system of claim 1, wherein:
said global grid includes a first square pattern having four transmission line segments as sides, said first square pattern including one receiver point substantially centered on each of said sides.

4. The clock distribution system of claim 3, wherein:
said regional grid is located within an inner boundary of said first square pattern.

5. The clock distribution system of claim 3, comprising:
a transmission line section within an inner boundary of said first square pattern, said transmission line section having a first end and a second end, said first end of said transmission line section being connected to one of said sides of said first square pattern and said second end of said transmission line section being connected to an opposing side of said first square pattern, said transmission line section having a drive point at a center location thereon to receive a drive signal from a buffer.

6. The clock distribution system of claim 1, comprising:
a plurality of other regional grids that are each coupled to multiple receiver points on said global grid to receive clock signal components from said global grid.

7. The clock distribution system of claim 1, wherein:
said regional grid is square shaped and includes four drive points to receive said clock signal components from said global grid, each of said four drive points being centrally located with respect to a corresponding side of said regional grid.

8. The clock distribution system of claim 7, wherein:
said drive points associated with opposing sides of said regional grid receive clock signal components that are in phase and said drive points associated with adjacent sides of said regional grid receive clock signal components that are 180 degrees out of phase.

9. The clock distribution system of claim 1, wherein:
said regional grid includes a plurality of horizontal transmission line segments interconnected with a plurality of vertical transmission line segments in a grid pattern, said grid pattern defining a plurality of square regions including a first square region, said first square region having a transmission line section therein having a first end and a second end, said first end of said transmission line section being connected to one side of said first square region and said second end of said transmission line section being connected to an opposing side of said first square region, said transmission line section having a drive point at a center location thereon to receive a drive signal from a buffer.

10. The clock distribution system of claim 1, wherein:
said global grid includes a number of separate sections.

11. The clock distribution system of claim 1, wherein:
said global grid and said regional grid are each part of a microelectronic circuit die.

12. A clock distribution system comprising:
a global grid having a plurality of transmission line segments to distribute a clock signal to a plurality of receiver points within the global grid; and
a regional grid having a plurality of drive points that are each coupled to a corresponding receiver point on said global grid to receive a clock signal component therefrom to drive said regional grid, said regional grid to generate standing waves using said clock signal components received from said global grid, said regional grid including a plurality of symmetry points that are each equidistant from adjacent drive points on said regional grid, said plurality of symmetry points being located on conductive portions of said regional grid, said symmetry points to act as standing wave termination nodes within said regional grid during system operation.

13. The clock distribution system of claim 12, wherein:
said symmetry points form short circuit nodes within said regional grid.

14. The clock distribution system of claim 12, wherein:
said symmetry points form open circuit nodes within said regional grid.

15. The clock distribution system of claim 12, wherein:
said regional grid includes a plurality of buffers to drive said plurality of drive points.

16. The clock distribution system of claim 12, wherein:
said regional grid is substantially square and said drive points are centrally located with respect to the sides of said regional grid.

17. The clock distribution system of claim 16, wherein:
said symmetry points are located along diagonals of said regional grid.

18. The clock distribution system of claim 12, wherein:
said drive points on said regional grid each receive a clock signal component that is substantially 180 degrees out of phase with that of an adjacent drive point on said regional grid.

19. The clock distribution system of claim 12, wherein:
said regional grid includes four sides that are each less than one half wavelength long at a nominal clock frequency of said system.

20. The clock distribution system of claim 12, wherein:
said global grid and said regional grid are each part of a microelectronic circuit die.

21. A microelectronic die comprising:
a clock signal source to provide a clock signal;
a global grid to distribute said clock signal to a plurality of receiver points, said plurality of receiver points being spaced $N\lambda/2$ from one another on said global grid, where N is a positive integer and $\lambda$ is the wavelength of a signal on said global grid having a nominal clock frequency;
a regional grid coupled to multiple receiver points on said global grid to receive first clock signal components therefrom, said regional grid to generate standing waves using said first clock signal components, said standing waves to distribute said clock signal throughout said regional grid in a relatively low skew manner; and
a plurality of loads coupled to said regional grid to receive second clock signal components from said regional grid.

22. The microelectronic die of claim 21, wherein:
said global grid is located on a first metal layer of said microelectronic die and said regional grid is located on a second metal layer of said microelectronic die, said second metal layer being different from said first metal layer.

23. The microelectronic die of claim 21, wherein:

said global grid and said regional grid are located on a common metal layer of said microelectronic die.

24. The microelectronic die of claim 21, wherein:

said regional grid generates standing waves that have no phase change regions.

25. The microelectronic die of claim 21, wherein:

said regional grid has an electrical distance to termination that is less than 180 degrees at said nominal clock frequency.

26. The microelectronic die of claim 21, wherein:

said regional grid is coupled to said multiple receiver points on said global grid through a plurality of buffers associated with said regional grid.

27. The microelectronic die of claim 21, wherein:

said regional grid is coupled to said multiple receiver points on said global grid through a plurality of receivers associated with said global grid.

* * * * *